United States Patent [19]

Aime et al.

[11] 4,151,412

[45] Apr. 24, 1979

[54] METHOD AND APPARATUS FOR AUTOMATIC SPECTRUM SCANNING IN A PROPORTIONAL COUNTER

[75] Inventors: Clement P. Aime, Mission Viejo; Donald L. Horrocks, Placentia, both of Calif.

[73] Assignee: Beckman Instruments, Inc., Fullerton, Calif.

[21] Appl. No.: 734,931

[22] Filed: Oct. 22, 1976

[51] Int. Cl.² .............................................. G01T 1/00
[52] U.S. Cl. .................................... 250/328; 250/369
[58] Field of Search ................. 250/328, 369; 328/115

[56] References Cited

U.S. PATENT DOCUMENTS

| 3,038,078 | 6/1962 | Kern | 250/328 |
| 3,214,700 | 10/1965 | Hook | 328/115 |

Primary Examiner—Harold A. Dixon
Attorney, Agent, or Firm—R. J. Steinmeyer; R. R. Meads; J. R. Shewmaker

[57] ABSTRACT

An automatic spectrum scanning technique for use in a proportional counting instrument, such as a gamma counter or liquid scintillation counter, by means of which a pulse-height or energy spectrum of a sample can be obtained automatically and without multichannel instrumentation. A pulse-height analyzer in the counting instrument has its upper and lower discriminator limits set to define a relatively narrow counting window, and the limits are successively changed to scan the window across the energy spectrum and thereby obtain an accurate measurement thereof. Counting at each increment of the scan is continued for a preselected maximum time interval, but is quickly terminated if the count rate falls below a preselected low threshold value, and is terminated early if the count rate is relatively high, i.e., if the statistical error value associated with the count is relatively low. A technique is also disclosed for correcting the counting statistics when the sample being analyzed has a relatively short half-life and the radioactivity of the sample falls off at a relatively rapid rate.

11 Claims, 3 Drawing Figures

METHOD AND APPARATUS FOR AUTOMATIC SPECTRUM SCANNING IN A PROPORTIONAL COUNTER

BACKGROUND OF THE INVENTION

The present invention relates generally to proportional counters, such as gamma counters and liquid scintillation counters used in the measurement of radiation. More particularly, the invention relates to a novel technique for obtaining a pulse-height or energy spectrum pertaining to the radiation from a sample of material to be analyzed or tested by the instrument.

By way of example of the type of counting instrument to which the present invention may be applied, a gamma counter is described more fully herein. Such a counter includes a radiation detector in the form of a sodium iodide crystal activated with thallium. Gamma rays emitted from a radioactive sample excite some of the electrons in the sodium iodide, and the excited electrons react with the thallium to produce light scintillations. These scintillations are then detected by a multiplier phototube and converted into corresponding electrical pulses. The resultant output pulses from the multiplier phototube should be directly proportional, in amplitude, to the energies of corresponding gamma rays from which the pulses were derived. Gamma counters usually include some means for sorting or filtering the output pulses from the phototube, so that an energy or pulse-height spectrum can be obtained.

By way of background, it should be noted that the energy spectrum that can be obtained by use of a gamma counter does not accurately reflect the energy spectrum of the incident radiation. Gamma rays are essentially monoenergetic, i.e., if a radioactive substance has the characteristic that it emits gamma rays at a particular energy level, every gamma ray from the substance will be emitted at exactly the same energy level. If an energy spectrum relating to the gamma radiation were to be plotted, with a count of detected gamma rays plotted along the vertical axis and the gamma ray energy plotted along the horizontal axis, the resulting spectrum would be a vertical line located at the energy level corresponding to the gamma radiation from the radioactive substance, or would be a number of such vertical lines, if the substance emits gamma radiation at a number of different energy levels. In practice, however, such a spectrum can never be obtained from a gamma counter. The sodium iodide scintillator does not always generate exactly the same number of excited electrons from each incident gamma ray, and the multiplier phototube does not always produce exactly the same amplification each time a scintillation is detected by its photocathode. Consequently, the energy or pulse-height spectrum relating to output from the multiplier phototube of a gamma counter will consist of a bell-shaped gaussian distribution, rather than a vertical line in the spectrum corresponding to the energy level of the incident gamma rays. This distribution is usually referred to as a photopeak in the pulse-height spectrum.

In the measurement of radiation other than gamma radiation, the detected radioactive decay events are generally not monoenergetic, and the actual energy spectrum of the incident radiation will be a true energy distribution. Quantitative knowledge relating to these distributions may be extremely important for some types of tests performed with a proportional counting instrument. In liquid scintillation counters, the true energy of a radioactive decay event may be masked by processes taking place in the liquid in which the radioactive sample is contained, resulting in a shifting of the pulse-height spectrum along the energy axis, and further increasing the need for obtaining an accurate spectrum.

Most proportional counters include one or more pulse-height analyzers connected to receive output pulses from the multiplier phototube. Each pulse-height analyzer has upper and lower discriminator limits or settings which can be adjusted to define a desired "window" in the pulse-height spectrum. The pulse-height analyzer acts essentially as a filter, rejecting pulses which fall outside the selected discriminator settings, and passing pulses which fall within the window to a scaler or counting device. For a given test or experiment using such an instrument, the discriminator settings are first adjusted to define a pulse-height window which covers a desired field of interest in the spectrum. It may be, for example, that only one particular photopeak is of interest, or that the radiation from one particular isotope is to be isolated from the radiation produced by other isotopes present in this sample. In any event, the discriminator limits in a pulse-height analyzer can be adjusted properly only if the operator of the instrument has prior knowledge of the entire energy spectrum pertaining to radiation from the sample.

Knowledge of the complete spectrum characteristics would also be important in the analysis of an unknown sample of radioactive material. The spectrum would then be used for purposes of identification of various isotopes in the sample.

Prior to this invention, there were two basic techniques for obtaining a pulse-height spectrum. First, it could be obtained manually in a single-channel instrument, by setting the upper and lower discriminator limits to cover a narrow window at one end of the spectrum, taking a count of pulses in that counting window, then readjusting the discriminator limits to move the window to successive incremental positions across the entire spectrum. This technique is not only very time consuming, but it requires the continued presence of an operator. A pulse-height spectrum can also be obtained by use of a multi-channel analyzer having a large number of channels, perhaps many hundreds, which can be separately adjusted to provide simultaneous counting in a plurality of narrow and contiguous counting windows. Such instruments are far too expensive for routine installation in medical facilities, for example, and are also too costly for many research applications. Consequently, there is a real need for some alternative technique for obtaining a pulse-height spectrum using a proportional counting instrument. The present invention fulfills this need.

SUMMARY OF THE INVENTION

The present invention resides in a method, and corresponding apparatus, for scanning the entire pulse-height spectrum obtained from a proportional counter, automatically and without operator intervention, and without the need for a multi-channel instrument. Briefly, and in general terms, the method of the invention includes the steps of setting the discriminator limits of a counting channel to accept and count pulses only within a desired, relatively narrow counting window, initiating counting in that counting channel, and terminating counting if either of three conditions is met. The counting will be terminated if the count rate as measured over a relatively small first time interval falls below a preselected low threshold value, or if the number of counts detected reaches a preselected upper threshold value, corresponding to a desired statistical error in the recorded count rate, or if a preselected second time interval has elapsed.

Thus, if the count rate is so low as to be relatively insignificant, counting will be terminated early so that more time can be spent counting in areas of the spectrum which are of greater statistical significance. By the same token, if the count rate is relatively high, a relatively high statistical accuracy can be achieved in a short time, and counting can also be terminated early. For those count rates falling between these upper and lower limits, counting will be continued for a preselected maximum time interval. In this manner, the spectrum is scanned very efficiently, and attention is focused on those portions of the spectrum which are most deserving of interest. On the termination of counting, the discriminator limits are reset to cover a different narrow counting window, and the steps of initiating and terminating counting, and resetting the discriminator limits, are repeated until the desired spectrum is obtained.

More specifically, the discriminator limits are initially set to cover a narrow counting window at one end of the spectrum to be obtained, and counting is continued in that window for the first time interval. Then, if the count rate as measured thus far is less than the preselected lower threshold value, counting is terminated. Otherwise, it is continued until either the preselected second time interval has elapsed, or until a preselected statistical error value is attained, corresponding to a particular maximum number of accumulated counts. When either of these events occurs, counting is also terminated, and the counting data for that particular counting window are recorded. Then, the discriminator limits of the counting channel are adjusted to cover a narrow counting window contiguous with the previous one, and the process is repeated until the narrow counting channel has been scanned across the entire region of interest in the spectrum.

In those cases in which the analysis of an isotope of relatively short half-life is involved, there may be a significant decrease in the radiation activity of the sample during the time that the spectrum is being scanned. To compensate for this, the method of the invention may include the additional step of correcting the count obtained at each incremental counting window. More specifically, this step involves the use of a second counting channel of which the upper and lower discriminator limits are set to cover the entire energy range of the spectrum being analyzed. The decrease in the radioactivity of the sample will then show up as a decrease in the count rate recorded in this second counting window at each incremental reading in the spectrum. Accordingly, the count rate in the incremental spectrum window can be related back to the time of the beginning of the scan, by multiplying by the ratio of the count rate in the second window at the beginning of the scan to the current count rate in the second window.

It will be appreciated from the foregoing that the present invention represents a significant advance in the field of radiation measurement. In particular, it provides a novel and highly efficient technique for obtaining an energy spectrum using a proportional counting instrument. Other aspects and advantages of the present invention will become apparent from the following more detailed description, taken in conjunction with the accompanying drawings.

DETAILED DESCRIPTION

Figure 1:
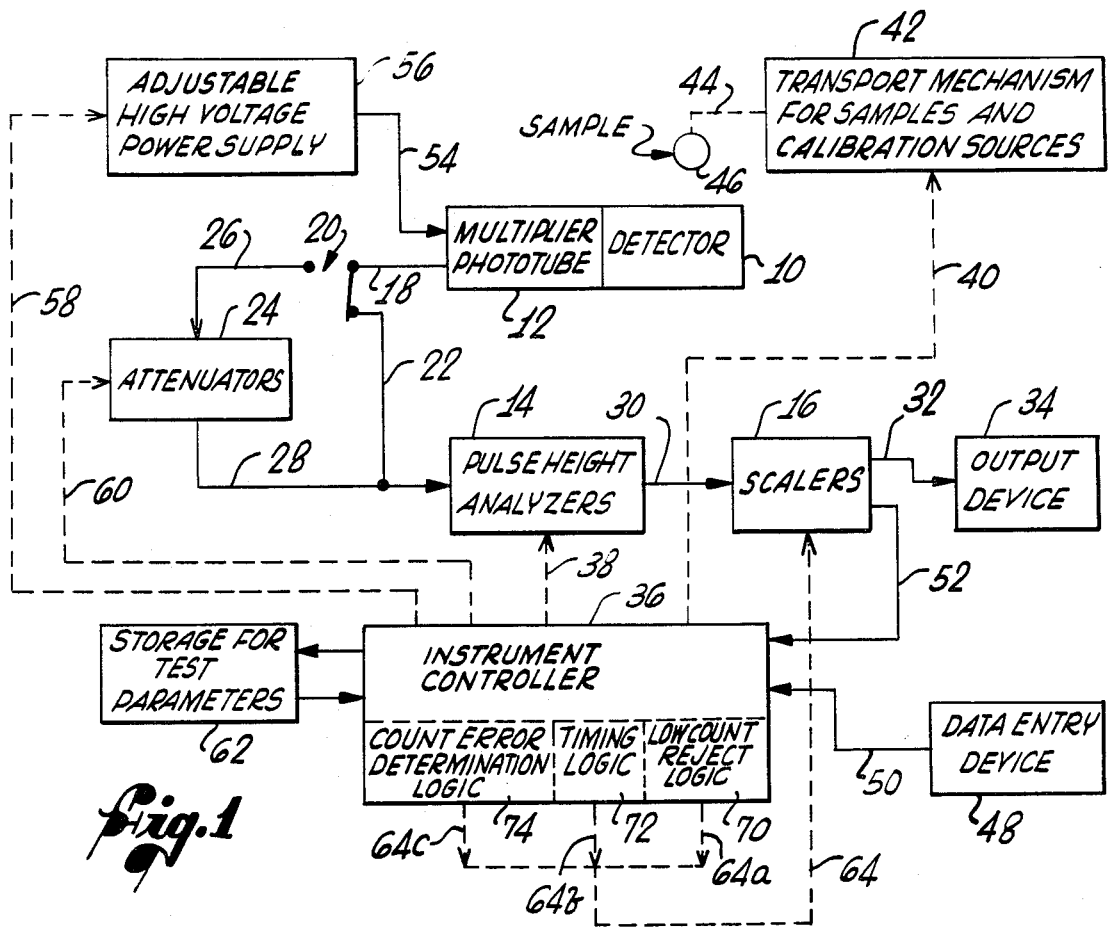
FIG. 1 is a block diagram of the apparatus of the present invention.

As shown in the drawings for purposes of illustration, the present invention is principally concerned with a novel technique for obtaining a pulse-height or energy spectrum relating to radioactivity from a sample placed in a proportional counter. The invention derives the pulse-height spectrum automatically, using a single counting channel and minimizing the counting time spent in regions of very low and very high activity.

For purposes of illustration, the invention will be described in relation to a gamma counter, although it will be appreciated that the invention is equally applicable to liquid scintillation counters and other instruments which generate output pulses which are substantially proportional to the energy levels of corresponding events from which they resulted. As shown in FIG. 1, a typical gamma counter includes a detector, indicated by reference numeral 10, an associated multiplier phototube 12, one or more pulse-height analyzers 14, and a corresponding number of scalers 16. The detector 10 usually takes the form of a sodium iodide crystal activated with thallium, which generates light scintillations in response to incident gamma radiation.

Located in proximity to the detector 10 is the multiplier phototube 12, which converts the scintillations from the detector into corresponding electrical pulses for output over line 18 to the pulse-height analyzers 14. The electrical pulses on line 18 may be transmitted directly to the pulse-height analyzers 14, as indicated by the illustrated position of a switch 20 to which the line 18 is connected, and thence by another line 22 from the switch to the pulse-height analyzers. Alternatively, the electrical pulses on line 18 may be transmitted through the switch 20 in its other position, through one or more precision attenuators 24 connected to the switch by line 26, and thence to the pulse-height analyzers 14 by line 28.

The pulse-height analyzers 14 operate essentially as amplitude filters, each analyzer having upper and lower discriminator limits which provide for the rejection of pulses falling outside of a given pulse-height or energy range. Typically, the upper and lower discriminator settings can be varied over an arbitrary scale, for example, from 0 to 1000. The outputs from the pulse-height analyzers 14, on line 30, represent counts of pulses falling within one or more selected relative energy ranges, and the scalers 16 are counting devices, as conventionally employed in instruments for radiation measurement. The outputs from the scalers 16 are connected, as indicated by line 32, to an output device 34, which may be any type of printing or display device.

The gamma-counting instrument as described thus far is conventional in the field of radiation measurement, and may be operated manually, either for calibration, for taking test measurements, or for obtaining an entire energy spectrum using a single counting channel. In manual operation, the upper and lower discriminator limits of the pulse-height analyzers 14 are set and a radioactive sample is placed in proximity to the detector 10. Then, the scalers 16 and output device 34 are monitored to obtain the desired counting results. Although the present invention, in some of its aspects, may be applied to such a manually operated instrument, it is more usefully employed with a more complex instrument of the type which is operated automatically under the direction of an instrument controller 36. The controller 36 may take the form of a hard-wired electronic device, or a specially designed microprocessor or minicomputer.

The controller 36 makes selections of upper and lower discriminator limits for the pulse-height analyzers 14, as indicated by the broken line 38, and also controls, as indicated by the broken line 40, a transport mechanism 42 which moves a succession of radioactive samples and calibration sources into operative relationship with the detector 10. This is shown only diagrammatically by the broken line 44 connecting the transport mechanism 42 with a sample, indicated by the circle 46.

The instrument controller 36 is also connected to receive control signals and data from a data-entry device 48, over line 50. A particular test using the instrument may be initiated by means of the data-entry device 48, or by other means, such as coded markers (not shown) placed in sequence before one or more samples to be measured, or before calibration sources to be moved into the instrument. Test parameters, such as the discriminator settings for the pulse-height analyzers 14, can be prestored within the instrument controller 36, and need not be entered through the data-entry device 48 on each occasion that a particular test run is to be performed. Once a test run is initiated, it can then proceed to completion automatically, with the output data from the scalers 16 being also made available to the instrument controller 36, over line 52. The pulse-height information derived from the pulse-height analyzers 14 provides a set of counts for selected, predefined, relative energy range "windows," , each window being measured between two points on a relative scale between 0 and 1000, which can be calibrated to correspond to a desired absolute energy range.

In the instrument illustrated, the multiplier phototube 12 derives its supply voltage over line 54 from an adjustable high voltage power supply 56, and the instrument controller 36 controls the magnitude of the high voltage supplied to the phototube, as indicated by the broken line 58. In addition, the controller 36 controls the settings of the attenuators 24, as indicated by the broken line 60. By automatic adjustment of the high voltage power supply 56, or of the attenuators 24, or both, the overall gain of the instrument, i.e., the relationship between the energy of the detected radiation and the amplitude of the output pulses, can be adjusted. Thus, the instrument can be calibrated for particular energy ranges, and the settings for those ranges can be stored and later retrieved for instant recalibration of the instrument. This aspect of the operation of the instrument is, of course, not critical to the present invention, but is described more fully in the U.S. Pat. No. 4,060,726 of Samuel H. Luitwieler, Jr., et al., issued Nov. 29, 1977, and entitled GAMMA COUNTER CALIBRATION SYSTEM, which patent is assigned to the same assignee as the present invention.

In accordance with the present invention, the instrument controller 36 is also utilized to obtain a pulse-height spectrum for output to the output device. The spectrum is generated in accordance with operator-selected parameters and, once initiated, scanning of the energy spectrum can proceed to completion automatically. Basically, the instrument controller 36 receives spectrum scanning parameters either directly from the data-entry device 48, or indirectly through a storage area 62 of the controller utilized for the storage of test parameters. The controller 36 selects upper and lower discriminator limits for one of the pulse-height analyzers 14, initially setting a narrow window at one end of the spectrum to be scanned. The controller 36 also controls the scalers 16, as indicated by broken line 64, to terminate counting when any of three particular termination criteria is met. After termination of counting in the selected narrow window, the instrument controller 36 selects a different incremental window, usually contiguous with the previous one, and the process is repeated in successive narrow windows across the entire spectrum of interest.

A significant aspect of the present invention is that termination of counting in each incremental window is controlled by three separate criteria, so that counting time is minimized and attention is focused only on those areas of the spectrum of the greatest interest. More specifically, counting in each incremental channel window is terminated either by low count reject logic 70, timing logic 72, or count error determination logic 74, all of these latter three elements being an integral part of the instrument controller 36. The effect of these three logic elements on the termination of counting is indicated by the broken lines 64a–64c connecting with line 64 to the scalers.

Figure 2:
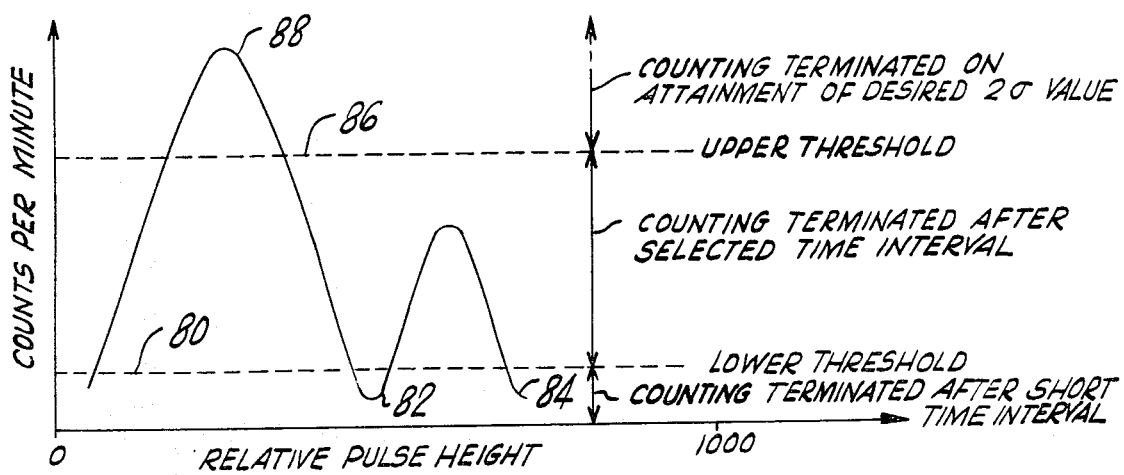
FIG. 2 is a portion of a typical pulse-height spectrum shown in relation to upper and lower thresholds utilized in the invention.

Operation of the instrument controller 36 in performing an automatic spectrum scan may be best appreciated by considering the energy spectrum shown in FIG. 2. It will be appreciated that, at some portions of a pulse-height spectrum, the count rate will be extremely low and usually of little significance to the user of the instrument. It would, therefore, be inefficient to devote large amounts of counting time to these portions of the spectrum. Accordingly, a lower threshold, indicated by the broken line 80 in FIG. 2, is designated as the count rate below which counting will not be continued beyond a preselected and relatively short time interval. For example, in the method of the invention to be described, if the lower threshold count rate is not attained in 0.1 minute, counting is terminated for that particular incremental window in the spectrum. This would be the case, for example, for those areas of the spectrum indicated by reference numerals 82 and 84.

If, on the other hand, the lower threshold count rate is exceeded after 0.1 minute, termination of counting is determined in part by the relationship of the count rate to an upper threshold, indicated by the broken line 86 in FIG. 2. The upper threshold is not designated as a count rate, but rather as an allowable statistical error value. As is well known, in any process of counting random events the statistical error in the result of the count varies inversely as the square root of the number of counts. In other words, as the number of counts accumulated increases, the statistical error in the result decreases. Thus, if an extremely large number of counts is accumulated, and the statistical error in the count rate is thus very small, there is little point in further continuing the count, since this will result in little significant increase in the accuracy of the result.

A statistical parameter which is often used in radiation measurement to indicate the reliability of a measurement of radiation is the standard deviation, indicated by the symbol $\sigma$. In some cases, it is desirable to express the reliability of a measurement in terms of a multiple of the standard deviation, e.g., $2\sigma$. Hereinafter the term "error value" will be used to indicate the standard deviation or multiples thereof. The significance of the standard deviation is that, for a large number of measurements, there is approximately a 68.3% probability that any equivalent measurement taken will be within $\pm\sigma$ of the mean value of the large number of measurements. After the accumulation of N counts, there is a 68.3% probability that a second measurement based on the accumulation of counts for the same time period will be within $\pm\sigma$ of the average value of radioactivity determined from the N counts. Stated another way, there is a 68.3% probability that the true radioactivity of the sample is within the range $\pm\sigma_N$ of the radioactivity determined from the N counts. When twice the standard deviation is used, i.e., $\pm 2\sigma$, this has a significance that approximately 95.5% of the measured values will be within $\pm 2\sigma$ of the average value. The calculation of $\pm 2\sigma$ is performed in accordance with the equation:

$$\pm 2\sigma_N = \pm 2\sqrt{N}, \quad (1)$$

or, in percentage form:

$$\pm 2\sigma_N(\%) = \pm(200\sqrt{N})/N = \pm \textcircled{R}\sqrt{N}. \quad (2)$$

In the illustrated embodiment of the present invention, the upper threshold illustrated in FIG. 2 is selected by designating a particular value of the percentage error value $\pm 2\sigma(\%)$. For example, if this error value is designated as 2.00, it will be apparent from equation (2) that this corresponds to a count of 10,000. Thus, if the maximum point on the spectrum of FIG. 2, indicated by reference numeral 88, represents a count of, e.g., 20,000 counts per minute, then a 10,000 count will be reached in 0.5 minute, and counting will be terminated at that time.

For those portions of the spectrum which fall between the lower threshold 80 and the upper threshold 86 (FIG. 2), counting will be terminated after a preselected time, for example, 1 minute. In summary, those portions below the lower threshold 80 will be counted for 0.1 minute, those portions between the lower threshold 80 and the upper threshold 86 will be counted for 1 minute, and those portions above the upper threshold 86 will be counted for a time which is less than a minute, depending upon the amount by which they exceed the upper threshold.

Figure 3:
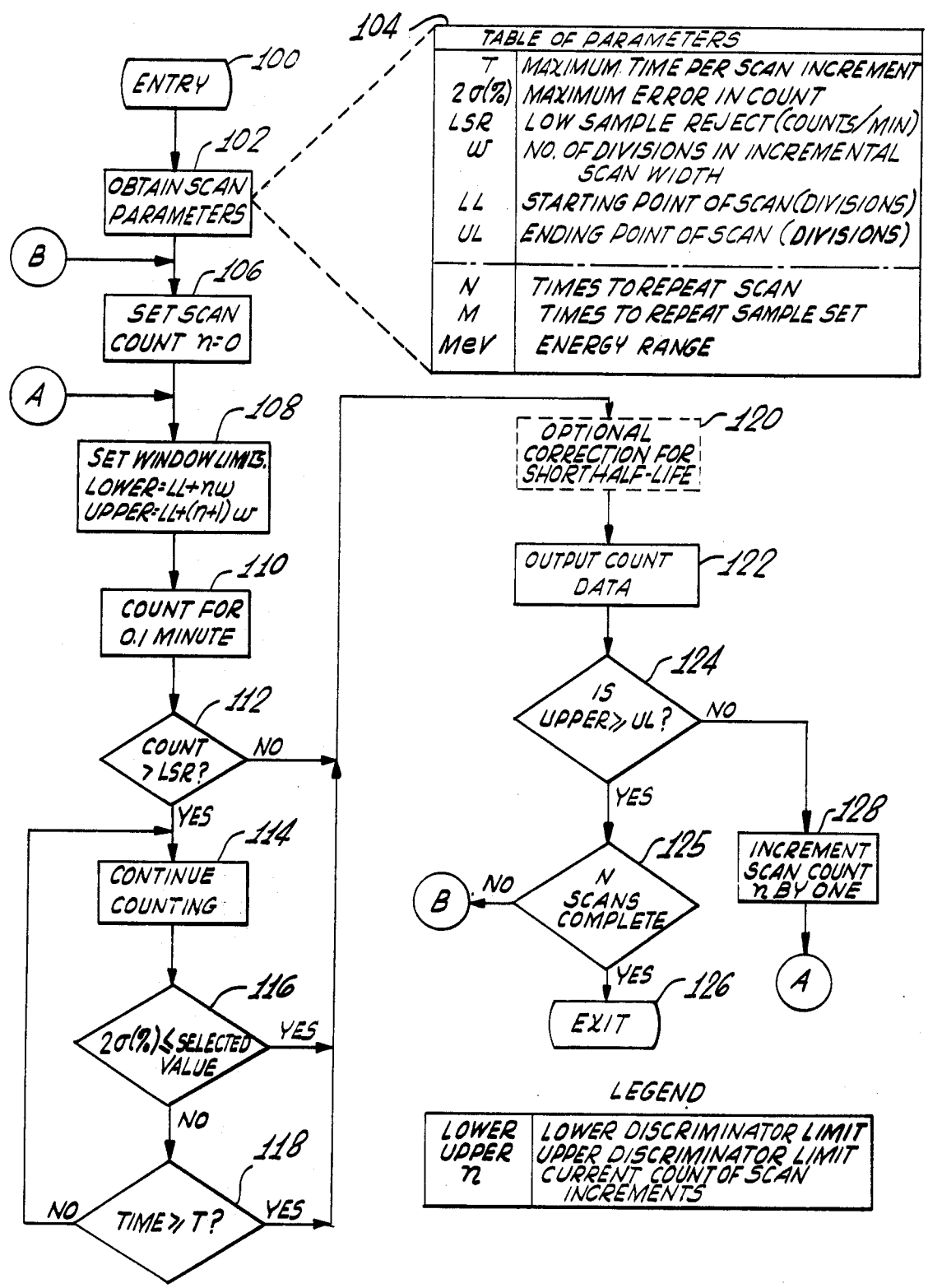
FIG. 3 is a flow chart showing the functional steps to be performed in accordance with the method of the present invention.

The method steps of the invention are set forth in more detail in the flow chart of FIG. 3. Entry to the sequence of steps is made at the entry block indicated by reference numeral 100, and, in the first step 102 the various scan parameters are obtained. As briefly mentioned earlier, the parameters for any operation of the instrument can be obtained directly through the data-entry device 48 (FIG. 1), or may be retrieved from the storage area 62. As indicated in the table of parameters 104 in FIG. 3, the scan parameters include: the maximum time (T) per scan increment, the maximum error value ($2\sigma(\%)$) in the count rate, the lower threshold or low sample reject (LSR) in counts per minute, the number of divisions in the incremental scan width (w), the starting point of the scan (LL divisions), and the ending point of the scan (UL divisions). As further indicated in the table 104 the user of the instrument may also designate that the scan is to be repeated N times, and that the scan is to cover a given set of samples M times. The user will also indicate the absolute energy range over which the instrument is to be calibrated, usually designated in terms of MeV (millions of electron volts).

In the next step, shown in block 106, a scan count, designated as n, is set to zero. The scan count is used to count the number of incremental windows in which counting has been performed across the energy spectrum. In the next step, at 108, the discriminator limits of the scanning window are set. The lower limit is set at LL + nw divisions and the upper limit is set at LL + (n+1)w divisions. Initially, since n = 0, the lower limit will be set at LL divisions and the upper limit at (LL + w) divisions.

In the next step, shown at block 110, counting is performed for 0.1 minute. Then, in block 112, the question is posed whether the count rate recorded during the initial 0.1 minute interval is greater than the preselected low sample reject rate. Thus, for example, if the low sample reject rate is selected to be 50 counts per minute, 5 or more counts would have to be accumulated during the 0.1 minute interval in order to exceed the low sample reject rate. If the low sample reject rate is not exceeded, counting is immediately terminated. If the low sample reject rate is exceeded, then counting is continued, as indicated in block 114, and the question is next posed, as shown in block 116, whether the error value $2\sigma(\%)$ is less than or equal to the selected value. If it is, this indicates that a relatively large count has already been accumulated, and the statistical error value associated with that count is sufficiently low that counting may be terminated without significant loss of accuracy.

If the error value as determined in block 116 has not reached the selected value, the next question asked, as shown in block 118, is whether the selected maximum time for scanning has been reached. If it has, counting is also terminated, but if it has not, control is transferred back to block 114, and counting is continued, there being repeated tests in blocks 116 and 118 to determine whether the selected error value has been reached or whether the selected maximum time per scan increment has elapsed.

When counting is finally terminated, as determined by the test for low sample reject rate in block 112, the test for error value in block 116, or the test for maximum time in block 118, the next step to be performed may involve an optional correction for samples of single isotopes having a relatively short half-life, as indicated at block 120. It will be appreciated that the method of the invention is essentially a serial one, in that each incremental window across the energy spectrum is scanned in sequence, rather than all of the windows being scanned in parallel, as in some multi-channel instruments. If the sample being analyzed is an isotope having a relatively short half-life, the count data obtained at the end of the spectrum scan will indicate significantly less activity than was present at the beginning of the scan, and the resultant spectrum obtained from the scan will be significantly distorted or skewed.

A correction can be made, however, if an additional counting channel is available in the instrument, as is usually the case. This second channel can be adjusted to measure radiation over the entire spectrum being examined, i.e., to measure the total energy of radiation from the sample. Thus, for each incremental window count in the scan, there will be obtained a total energy count rate from the additional counting channel. Suppose, for example, that the total energy count rate recorded during the first increment of the scan is 50,000 counts per minute, and that the total energy count rate recorded at the time of the next increment of the scan is 45,000 counts per minute. The second incremental scan count can then be corrected by multiplying by the factor 50/45. Third and subsequent incremental scan counts can also be corrected in a similar manner to relate back to the start of the spectrum scan. Of course, these corrections would not be necessary for the testing of isotopes of relatively long half-life.

In the next step, shown at block 122, the data for the most recently completed incremental scan count are output either directly on the output device 34, or may be stored for later output. The output data include the count rate for the increment, the error value associated with the count rate, and an indication of the position of the incremental scan window, i.e., the values of the corresponding discriminator settings.

After the data has been output or stored, the question is posed, in block 124, whether the current upper discriminator limit equals or exceeds the selected upper limit for the scan. If it does, the scan is complete and the question is posed, in block 125, whether the scan has been repeated the requested number of times. If it has, exit is made from the sequence as indicated by the exit block 126. If it has not, control is transferred through indicator B back to block 106, to repeat the scan. If the scan is not yet complete, as determined in block 124, the scan count n is incremented by one, as indicated in block 128, and control is transferred through indicator A back to block 108, where the next window limits are set, and the scan window is effectively moved by an increment of w divisions in an upward direction along the energy scale. The counting steps are then repeated for the new scan window position, and the process is continued until the selected upper limit of the scan is reached.

It will be appreciated from the foregoing that the present invention represents a significant advance in the field of radiation measurement. In particular, it provides hitherto unavailable means for obtaining a pulse-height or energy spectrum of a sample, for the purpose of identifying unknown isotopes in the sample, or to aid in setting appropriate counting window parameters for subsequent tests. Moreover, the invention accomplishes this end without the use of expensive multi-channel instrumentation, and does so in an automatic and highly efficient manner. It will also be appreciated that, although the invention has been described in relation to a specific embodiment illustrated herein, various modifications may be made without departing from the spirit and scope of the invention. In particular, it is agin emphasized that the invention is not limited to gamma counters, although a gamma counter has been illustrated and described herein by way of example. Accordingly, the invention is not to be limited except as by the appended claims.

We claim:

1. For use in a proportional counting instrument, a method of deriving an energy spectrum relating to a sample of radioactive material, comprising the steps of:

counting pulses over a selected narrow energy range or window for a time interval which is determined in part by the count rate measured in that window; and successively changing the parameters of the window in which counting is performed, in order to scan the energy spectrum.

2. A method as set forth in claim 1, wherein said counting step includes terminating counting after a relatively short time interval if the measured count rate falls below a selected low threshold value.

3. A method as set forth in claim 2, wherein said counting step further includes terminating counting as soon as a preselected upper threshold number of counts is accumulated.

4. A method as set forth in claim 3, wherein said counting step further includes terminating counting after a preselected time period if the count rate exceeds the low threshold value but the count does not exceed the upper threshold.

5. A method as set forth in claim 1, and further including the step of correcting the counts obtained in said counting step to compensate for a relatively rapid decrease in radioactivity from the sample.

6. A method as set forth in claim 5, wherein said correcting step includes:

measuring a total energy count rate at the same times that counting is performed in said counting step; and multiplying the count rate obtained in said counting step by the ratio of total energy count rate at a selected reference time to the total energy count rate at the time of said counting step.

7. For use in a proportional counter, a method of deriving an energy spectrum relating to a sample, comprising the steps of:

setting discriminator limits of a counting channel to count pulses within a desired incremental energy window;

initiating counting in the counting channel;

terminating counting if either (1) the count rate measured over a predetermined first time interval falls below a preselected low threshold value, or (2) a preselected second time interval, greater than the first, has elapsed, or (3) the number of counts reaches an upper threshold value corresponding to a preselected statistical error value;

resetting the discriminator limits, after termination of counting, to cover a different incremental energy window; and repeating said steps of initiating and terminating counting and said step of resetting the discriminator limits, until the desired spectrum is obtained.

8. A method as set forth in claim 7, and further including the step of displaying the count determined from the incremental energy window after each of said terminating steps.

9. A method as set forth in claim 7, and further including the step of correcting the count for display in said displaying step, to compensate for a relatively rapid decrease in the rate at which energy is radiated from the sample.

10. A method as set forth in claim 9, wherein said correcting step includes:

initiating and terminating counting in a separate counting window covering substantially the entire energy spectrum being scanned, the counting in this total-energy window being performed at the same times as counting in the narrow counting window; and multiplying the count rate obtained in the narrow counting window by the ratio of the total-energy count rate obtained at a selected reference time to the total-energy count rate obtained at the same time as the count rate in the narrow counting window.

11. The method as set forth in claim 7, and further including the step of repeating all of the foregoing steps a preselected number of times, to perform a plurality of spectrum scans relating to the same sample.

* * * * *